United States Patent
Kim et al.

(10) Patent No.: US 9,634,355 B2
(45) Date of Patent: Apr. 25, 2017

(54) POLYMER ELECTROLYTE FOR LITHIUM BATTERY AND LITHIUM BATTERY INCLUDING THE POLYMER ELECTROLYTE

(71) Applicant: Samsung Electronics Co., Ltd., Suwon-si, Gyeonggi-do (KR)

(72) Inventors: Kihyun Kim, Seoul (KR); Dongjoon Lee, Suwon-si (KR); Hyukjae Kwon, Suwon-si (KR); Taeyoung Kim, Seoul (KR); Dongmin Im, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 112 days.

(21) Appl. No.: 14/718,490

(22) Filed: May 21, 2015

(65) Prior Publication Data

US 2016/0056502 A1  Feb. 25, 2016

(30) Foreign Application Priority Data

Aug. 25, 2014 (KR) .................. 10-2014-0111041

(51) Int. Cl.
| | |
|---|---|
| *H01M 10/26* | (2006.01) |
| *H01M 10/0565* | (2010.01) |
| *H01M 10/00* | (2006.01) |
| *H01M 12/08* | (2006.01) |
| *H01M 4/62* | (2006.01) |
| *H01M 10/052* | (2010.01) |

(52) U.S. Cl.
CPC ........ *H01M 10/0565* (2013.01); *H01M 4/622* (2013.01); *H01M 10/052* (2013.01); *H01M 12/08* (2013.01); *H01M 2300/0082* (2013.01); *Y02E 60/128* (2013.01)

(58) Field of Classification Search
CPC ...................................................... H01M 10/26
USPC .......................................................... 528/391
See application file for complete search history.

(56) References Cited

FOREIGN PATENT DOCUMENTS

| | | |
|---|---|---|
| CN | 102702507 A | 10/2012 |
| EP | 0820805 A3 | 10/1998 |
| JP | 2782837 B2 | 5/1998 |
| JP | 1112374 A | 1/1999 |
| WO | 9844574 A1 | 10/1998 |

OTHER PUBLICATIONS

CN 102702507 translation (prior art with English abstract).*

(Continued)

*Primary Examiner* — Duc Truong
(74) *Attorney, Agent, or Firm* — Cantor Colburn LLP

(57) ABSTRACT

A polymer electrolyte for a lithium battery, the polymer electrolyte comprising a compound represented by Formula 1:

Formula 1

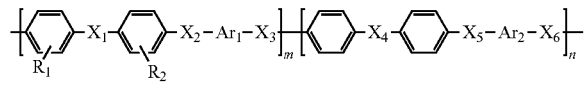

wherein, in Formula 1, $X_1$ to $X_6$, $Ar_1$, $Ar_2$, $R_1$, $R_2$, m, and n are the same as defined in the detailed description of the present specification.

17 Claims, 3 Drawing Sheets

FORMULA 1

V.S.

POLYETHYLENEOXIDE (PEO)

(56) References Cited

OTHER PUBLICATIONS

D. Ayala, et al. "Gas separation properties of aromatic polyimides", Journal of Membrane Science 215 (2003) 61-73.
John W. Connell, et al., "The Effect of Low Earth Orbit Atomic Oxygen Exposure on Phenylphosphine Oxide-containing Poly(arylene ether)s", Polymers for Advanced Technologies, vol. 9, pp. 11-19, (1998).

* cited by examiner

POLYMER ELECTROLYTE FOR LITHIUM BATTERY AND LITHIUM BATTERY INCLUDING THE POLYMER ELECTROLYTE

CROSS-REFERENCE TO RELATED APPLICATION

This application claims priority to Korean Patent Application No. 10-2014-0111041, filed on Aug. 25, 2014 in the Korean Intellectual Property Office, and all the benefits accruing therefrom under 35 U.S.C. §119, the content of which is incorporated herein in its entirety by reference.

BACKGROUND

1. Field

The present disclosure relates to a polymer electrolyte for a lithium battery and a lithium battery including the polymer electrolyte.

2. Description of the Related Art

Conventionally, a carbonate organic electrolyte, such as an ethylene carbonate or a propylene carbonate, has been used as an electrolyte for a lithium battery. However, the carbonate organic electrolyte has a high risk of leakage, and therefore, may present a safety issue, such as an explosion. In order to solve this problem, a solid electrolyte, such as polyethylene oxide (PEO), may be used in a lithium battery instead.

However, in a lithium metal battery (in particular, lithium air battery), PEO may decompose at high voltage. Since charging and discharging of a lithium air battery involves applying high voltage, it has been established that when the PEO contacts oxygen provided from a positive electrode, free radicals are produced, the PEO is oxidized, the polymer is dissociated, and a by-product carbon dioxide is formed as a result. A lifespan of such a lithium air battery becomes reduced, and thus, the battery becomes impractical. Thus there remains a need in a novel electrolyte that is stable at high voltage and has excellent mechanical properties.

SUMMARY

Provided is a polymer electrolyte for a lithium battery having a high thermal stability and excellent mechanical properties.

Provided is a lithium battery including the polymer electrolyte.

Additional aspects will be set forth in part in the description which follows and, in part, will be apparent from the description, or may be learned by practice of the presented embodiments.

According to an aspect of an exemplary embodiment, a polymer electrolyte for a lithium battery, the polymer electrolyte includes a compound represented by Formula 1:

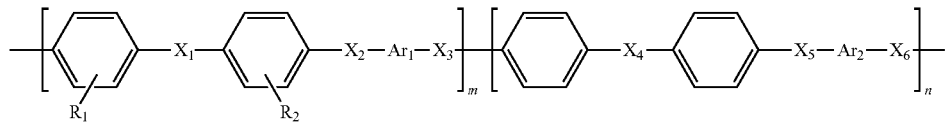

Formula 1 wherein, in Formula 1, $X_1$, $X_2$, $X_3$, $X_4$, $X_5$, and $X_6$ are each independently —$SO_2$— or —O—, $Ar_1$ and $Ar_2$ are each independently a substituted or unsubstituted C6-C30 arylene group or a substituted or unsubstituted C5-C30 heteroarylene group, at least one selected from $R_1$ and $R_2$ is a lithium ion conductive group, provided that when only one selected from $R_1$ and $R_2$ is a lithium ion conductive group, the other selected from $R_1$ and $R_2$ is a hydrogen atom, 0≤m≤1, 0≤n≤1, and m+n=1, and a weight average molecular weight of the compound represented by Formula 1 is in a range of about 500 grams per mole to about 1,000,000 grams per mole According to another aspect of an exemplary embodiment, a lithium battery includes a positive electrode; a negative electrode; and the polymer electrolyte according to the exemplary embodiment, which is disposed between and in contact with the positive electrode and the negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
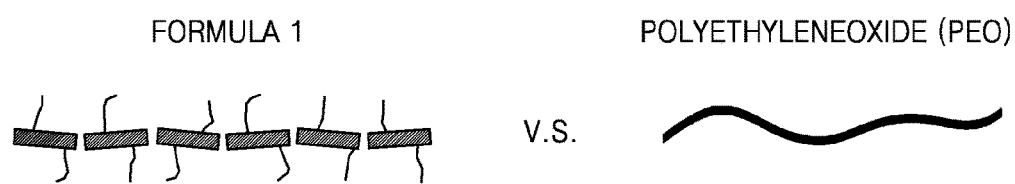
FIG. 1 illustrates a structural difference between a polymer represented by Formula 1 and a polyethylene oxide.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a polymer electrolyte for a lithium battery according to an exemplary embodiment, and a lithium battery including the electrolyte will be described in detail.

The polymer electrolyte for a lithium battery according to an exemplary embodiment may include a compound represented by Formula 1:

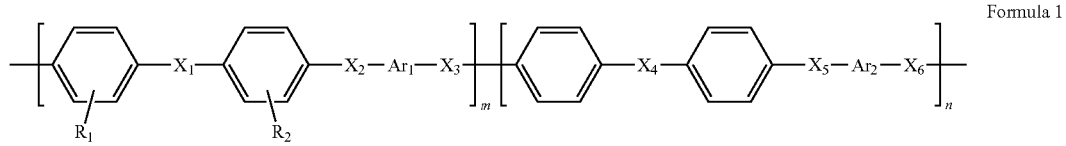

Formula 1

In Formula 1, $X_1$, $X_2$, $X_3$, $X_4$, $X_5$, and $X_6$ may be each independently —$SO_2$— or —O—; $Ar_1$ and $Ar_2$ may be each independently a substituted or unsubstituted C6-C30 arylene group or a substituted or unsubstituted C5-C30 heteroarylene group;

at least one selected from $R_1$ and $R_2$ may be a lithium ion conductive group, provided that when one selected from $R_1$ and $R_2$ is a lithium conductive group, the other one selected from $R_1$ and $R_2$ is a hydrogen atom;

$0 \leq m \leq 1$, $0 \leq n \leq 1$, and $m+n=1$; and a weight average molecular weight ($M_w$) of the compound may be in a range of about 500 grams per mole (g/mol) to about 1,000,000 g/mol.

As used herein, in Formula 1, a repeating unit that includes $R_1$ and $R_2$ and is represented by the repetition number m is referred to as "repeating unit 1", and a repeating unit that is represented by the repetition number n is referred to as "repeating unit 2". In Formula 1, when the repeating unit 1 and the repeating unit 2 are both present, the repeating unit 1 and the repeating 2 may immediately follow one another, may follow one another in a regular pattern or irregular pattern.

As shown in FIG. 1, the compound represented by Formula 1 forms a firm backbone with an arylene group, —$SO_2$—, or —O—, compared to a polymer having an ethylene oxide unit as a backbone, such as a polyethylene oxide. Thus, the compound represented by Formula 1 may have high thermal stability and excellent mechanical properties. Also, since the compound represented by Formula 1 has a lithium ion conductive group as a side chain, mobility of lithium ions increases, and thus an ion conductivity of the compound represented by Formula 1 improves.

Figure 2:
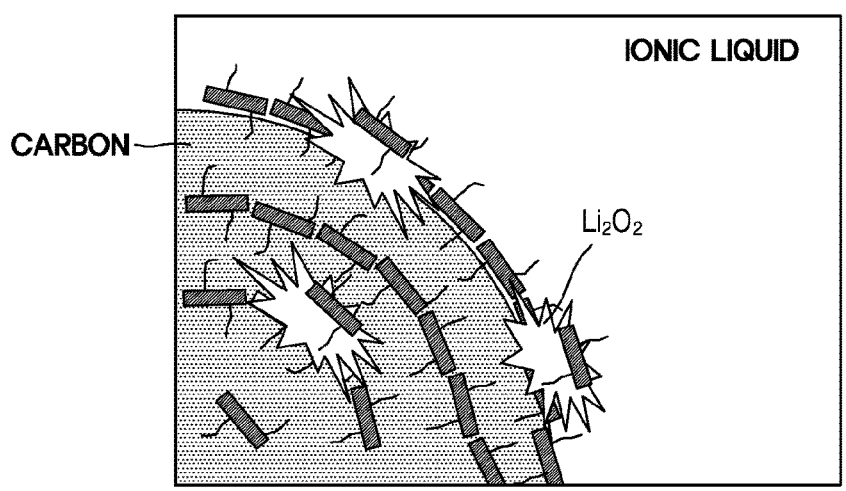
FIG. 2 illustrates the principle of the polymer represented by Formula 1 preventing decomposition of carbon and ionic liquid.

As shown in FIG. 2, the compound represented by Formula 1 may serve as a surfactant, and when a lithium air battery includes the compound represented by Formula 1 as an electrolyte, decomposition of carbon or ionic liquid caused by $Li_2O_2$, which is produced during the discharge of the lithium air battery, may be prevented.

In an embodiment, in Formula 1, $X_1$ and $X_4$ may be —$SO_2$—, and $X_2$, $X_3$, $X_5$, and $X_6$ may be —O—. Thus, in that embodiment, a formula representing this compound may be Formula 7.

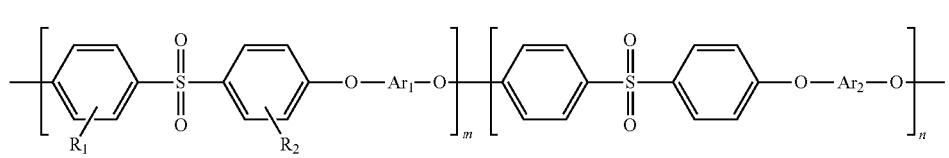

In Formula 7, $Ar_1$, $Ar_2$, $R_1$, $R_2$, m, and n may be the same as defined in connection with Formula 1.

In Formula 1, $Ar_1$ and $Ar_2$ may be each independently a substituted or unsubstituted C6-C30 arylene group or a substituted or unsubstituted C5-C30 heteroarylene group. For example, $Ar_1$ and $Ar_2$ may be each independently selected from structures below:

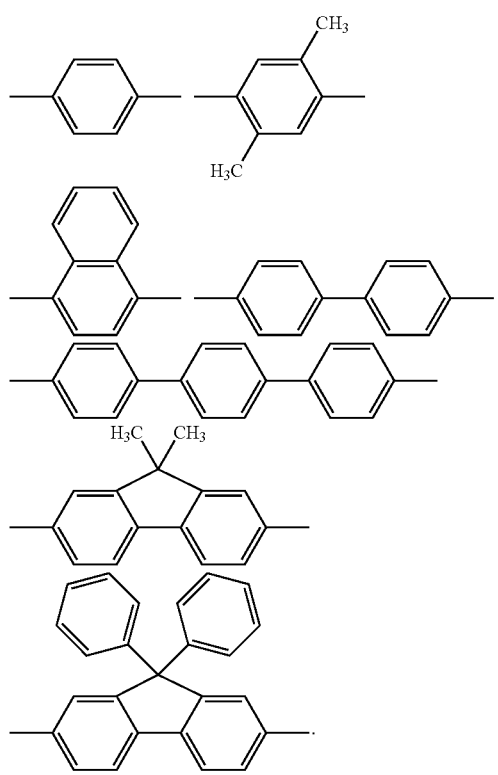

In Formula 1, one of or both groups $R_1$ and $R_2$ may be a lithium ion conductive group. The lithium ion conductive group may be at least one selected from Formulae 2 to 6.

$$—(R_3)_a—SO_3Li \qquad \text{Formula 2}$$

$$—(R_4)_b—SO_2—NLi_2 \qquad \text{Formula 3}$$

$$—(R_5)_c—SO_2—N(Li)—SO_2—R_9 \qquad \text{Formula 4}$$

$$—(R_6)_d—SO_2—(R_7)_e—COOLi \qquad \text{Formula 5}$$

$$—(R_8)_f—COOLi \qquad \text{Formula 6}$$

In Formulae 2 to 6, $R_3$, $R_4$, $R_5$, $R_6$, $R_7$, and $R_8$ may be each independently a single bond, a substituted or unsubstituted C1-C10 alkylene group, a substituted or unsubstituted C6-C20 arylene group, or a substituted or unsubstituted C3-C20 heteroarylene group;

$R_9$ is a substituted or unsubstituted C1-C10 alkyl group, a substituted or unsubstituted C6-C20 aryl group, or a substituted or unsubstituted C3-C20 heteroaryl group; and a, b, c, d, e, and f are each independently 0 or 1.

In this case, $R_3$, $R_4$, $R_5$, $R_6$, $R_7$, and $R_8$ may each independently have at least one hydrogen that is substituted with a halogen atom, a nitro group, a cyano group, a carboxylic acid group or its salt, a sulfonamide group, or a substituted or unsubstituted C1-C20 alkyl group that is substituted with a halogen, and $R_9$ may have at least one hydrogen that is substituted with a halogen.

Examples of the lithium ion conductive group may include —$SO_3Li$, —COOLi, —$SO_2N(Li)SO_2CF_3$, —$SO_2N(Li)SO_2CF_2CF_3$, —$SO_2C_6H_4COOLi$, —$C_6H_3(SO_2NH_2)$COOLi, —CH(COOLi)$CH_2$COOLi, —$C_6H_3$(OH)COOLi, —$C_6H_2(NO_2)_2$COOLi, and —$CH_2C(CH_3)_2$COOLi.

In some embodiments, the compound represented by Formula 1 may be, for example, a compound represented by Formula 8.

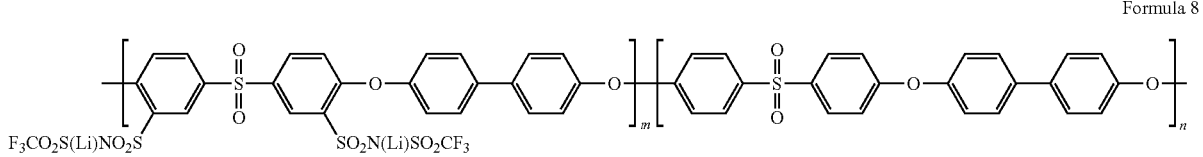

In Formula 1, m and n are as defined in relation to Formula 1.

In Formula 1, a ratio of m to n (m:n) may be in a range of about 100:0 to about 0:100. For example, a ratio of m:n may be in a range of about 100:0 to about 10:90, about 100:0 to about 20:80, about 100:0 to about 30:70, about 100:0 to about 40:60, about 100:0 to about 50:50, or about 90:10 to about 50:50. When a ratio of m:n is within these ranges, decomposition of carbon or ionic liquid caused by $Li_2O_2$ that is formed during the discharge of a lithium air battery may be effectively suppressed.

A weight average molecular weight ($M_w$) of the compound represented by Formula 1 may be about 500 g/mol or higher, for example, about 1,000 g/mol or higher, about 10,000 g/mol or higher, or about 100,000 g/mol or higher. For example, a weight average molecular weight of the compound represented by Formula 1 may be in a range of about 500 g/mol to about 1,000,000 g/mol. For example, a weight average molecular weight of the compound represented by Formula 1 may be in a range of about 1,000 g/mol to about 1,000,000 g/mol or about 100,000 g/mol to about 700,000 g/mol. The weight average molecular weight is measured by using a gel permeation chromatography (GPC). When a weight average molecular weight of a polymer is within these ranges, the polymer is stable with respect to an electrolyte, and therefore, may have excellent chemical and physical properties.

The compound represented by Formula 1 may be used to form a polymer electrolyte of a lithium battery and, for example, may be used to form a lithium ion battery, a lithium metal battery, or, particularly, a lithium air battery.

Since the polymer electrolyte has excellent membrane-forming properties, the polymer electrolyte, by itself, may form a free-standing membrane. Further, the polymer electrolyte may form an impregnated membrane, which is impregnated with an ionic liquid.

The polymer electrolyte may serve as a binder to enhance a bonding strength between an ionic liquid and a carbon material when preparing a positive electrode of a lithium battery, for example, a lithium air battery.

The polymer electrolyte may further include a lithium salt.

The lithium salt may serve as a source of lithium ions in the polymer electrolyte and, for example, may catalyze lithium ion migration between a positive electrode and a negative electrode of the lithium battery.

The lithium salt may be, for example, at least one selected from $LiPF_6$, $LiBF_4$, $LiSbF_6$, $LiAsF_6$, $LiN(SO_2C_2F_5)_2$, $LiN(SO_2F_2)_2$, $Li(CF_3SO_2)_2N$ (hereinafter, also referred to as "LiTFSI"), $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are each independently a natural number), LiF, LiBr, LiCl, LiI, and lithium bis(oxalato)borate ($LiB(C_2O_4)_2$), but it is not limited thereto, and any lithium salt available in the art may be used as the lithium salt.

When the polymer electrolyte is included in a lithium air battery among lithium batteries, a lithium sulfonimide compound may be used as the lithium salt.

Examples of the lithium sulfonimide compound may include lithium fluoroalkylsulfonimide, lithium fluoroarylsulfonimide, or lithium fluoroalkylarylsulfonimide.

Examples of the lithium sulfonimide compound may include $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ (wherein, p and q are different from each other, and p and q are each independently an integer of 1 to 20), $LiN((SO_2)_2C_pF_{2p})$ (wherein, p is an integer of 1 to 10), $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ (wherein, p is an integer of 1 to 10), and $LiN(C_{10}F_7SO_2)(C_pF_{2p+1}SO_2)$ (wherein, p is an integer of 1 to 10).

An amount of the lithium salt may be in a range of about 5 moles (mol) to about 20 mol based on 1 mol of the compound represented by Formula 1. When an amount of the lithium salt is within this range, the polymer electrolyte may have appropriate conductivity and viscosity, and thus, may allow lithium ions to effectively migrate.

The electrolyte may be formed as a free-standing membrane or an impregnated membrane, prepared by impregnating an ionic liquid into a membrane.

A thickness of the polymer electrolyte may be, for example, about 100 micrometers (μm) or less, or, for example, in a range of about 20 μm to about 100 μm. When a thickness of the polymer electrolyte is within these ranges, a high ion conductivity of the polymer electrolyte may be secured, mechanical properties of the polymer electrolyte may be improved, and thus, when a lithium metal negative electrode is used, an excellent suppression on dendrite formation may be achieved.

When the polymer electrolyte further includes an ionic liquid, examples of the ionic liquid may include at least one compound selected from diethylmethylammonium trifluoromethanesulfonate ([dema][TfO]), dimethylpropylammonium trifluoromethanesulfonate ([dmpa][TfO]), N,N-diethyl-N-methyl-N-(2-methoxyethyl)ammonium bis(trifluoromethanesulfonyl)imide ([DEMA][TFSI]), N-methyl-N-propylpiperidinium bis(trifluoromethanesulfonyl)imide ([PP13][TFSI]), N-butyl-N-methylpyrrolidinium bis(trifluoromethanesulfonyl)imide ([Py14][TFSI]), and methylpropylpiperidinium trifluoromethanesulfonylimide ([mpp][TFSI]). Examples of the ionic liquid are not limited thereto, and any ionic liquid available in the art may be used.

For example, the ionic liquid may be a compound that is constituted of a cation, such as linear or branched substituted ammonium, imidazolium, pyrrolidinium, or piperidinium; and an anion, such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, or $(CN)_2N^-$.

According to another aspect of an exemplary embodiment, a lithium battery may include a positive electrode, a negative electrode, the described above polymer electrolyte disposed between and in contact with the positive electrode and the negative electrode.

The lithium battery may be, for example, a lithium ion battery or a lithium metal battery. The lithium battery may be, for example, a lithium air battery.

Figure 3:
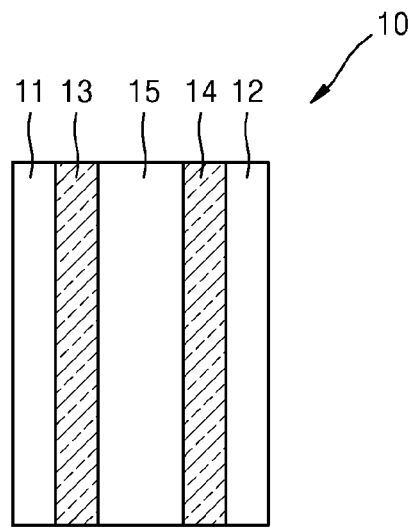
FIG. 3 is a cross-sectional view schematically illustrating a structure of a lithium air battery according to an exemplary embodiment.

FIG. 3 is a schematic view of an example of a lithium air battery 10 according to an exemplary embodiment. Referring to FIG. 3, the lithium air battery 10 may include a first current collector 11, a second current collector 12, a positive electrode 13, a negative electrode 14, and a first electrolyte 15 disposed between the positive electrode 13 and the negative electrode 14.

The positive electrode 13 is formed on the first current collector 11, and oxidation and reduction of oxygen occurs therein by using oxygen as an active material. The negative electrode 14 is formed on the second current collector 12, and oxidation and reduction of a lithium metal occurs therein. The first electrolyte 15 allows lithium ions to migrate between the positive electrode 13 and the negative electrode 14.

The current collectors 11 and 12 have a porous structure, which may have a net shape or a mesh shape, in order to increase a rate of oxygen diffusion. For example, the current collectors 11 and 12 may be a porous metal plate that is formed of stainless steel, nickel, or aluminum, but they are not limited thereto, and any current collector available in the art may be used. In order to prevent oxidation, the current collectors 11 and 12 may be coated with an oxidation-resistant metal or an alloy.

The positive electrode 13 including oxygen as a positive electrode active material may be a porous conductive material. Thus, any material having porosity and conductivity may be used as the positive electrode 13. For example, a carbon material having porosity may be used as the material. Examples of the carbon material may include carbon black, graphite, graphene, active carbon, carbon nanotubes, and carbon fibers. Also, a metallic conductive material, such as a metal fiber or a metal mesh may be used as the positive electrode 13. For example, a metallic powder, such as copper, silver, nickel, or aluminum, may be used as the positive electrode 13. Also, an organic conductive material such as a polyphenylene derivative may be used as the positive electrode 13. The conductive materials may be used alone or as a mixture thereof.

A catalyst for assisting oxidation and reduction of oxygen may be added to the positive electrode 13. Examples of the catalyst may include a noble metal catalyst, such as platinum, gold, silver, palladium, ruthenium, rhodium, or osmium; an oxide catalyst, such as a manganese oxide, an iron oxide, a cobalt oxide, or a nickel oxide; or an organic metal catalyst, such as cobalt phthalocyanine, but they are not limited thereto, and any catalyst for oxidation and reduction of oxygen in the art may be used.

The catalyst may be contained in a carrier. Examples of the carrier may include an oxide, zeolite, clay minerals, or carbon. Examples of the oxide may include at least one oxide of alumina, silica, zirconium oxide, and titanium dioxide. Also, the oxide may be an oxide including at least one metal selected from Ce, Pr, Sm, Eu, Tb, Tm, Yb, Sb, Bi, V, Cr, Mn, Fe, Co, Ni, Cu, Nb, Mo, and W. Examples of the carbon may include carbon blacks, such as ketjen black, acetylene black, channel black, or lamp black; graphites, such as natural graphite, artificial graphite, or expanded graphite; active carbons; and carbon fibers. However, the carrier is not limited thereto, and any carrier available in the art may be used.

The positive electrode 13 may further include a binder. The binder may include a thermoplastic polymer or a thermosetting polymer. Examples of the binder may include polyethylene, polypropylene, polytetrafluoroethylene (PTFE), polyvinylidene fluoride (PVDF), styrene-butadiene rubbers, tetrafluoroethylene-perfluoroalkylvinyl ether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, and ethylene-acrylic acid copolymers. The thermoplastic and thermosetting polymers may be used alone or as a mixture thereof, but the binder is not limited thereto, and any binder available in the art may be used.

The positive electrode 13 may be prepared by, for example, mixing the oxygen oxidation reduction catalyst, conductive material, and binder and adding an appropriate solvent thereto to prepare a positive electrode slurry, coating and drying a surface of the first current collector 11 with the positive electrode slurry, or, optionally, press-molding the positive electrode slurry to the first current collector 11 to improve an electrode density. The positive electrode 13 may, optionally, include a lithium oxide. Optionally, the oxygen oxidation reduction catalyst may be omitted.

The negative electrode 14 includes a lithium metal, an alloy based on a lithium metal, or a material capable of intercalating and deintercalating lithium, but it is not limited thereto. The negative electrode 14 determines a capacity of a lithium air battery. The alloy based on a lithium metal may be, for example, an alloy of lithium with aluminum, tin, magnesium, indium, calcium, germanium, antimony, bismuth, or lead.

The first electrolyte 15 includes the compound represented by Formula 1 below and a lithium salt.

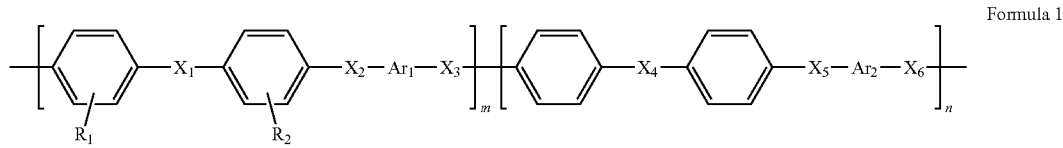

Formula 1

In Formula 1, $X_1$ to $X_6$, $Ar_1$, $Ar_2$, $R_1$, $R_2$, m, and n are as defined above.

The whole amount of the first electrolyte 15 or a part of it may be impregnated into the positive electrode having porosity.

Figure 4:
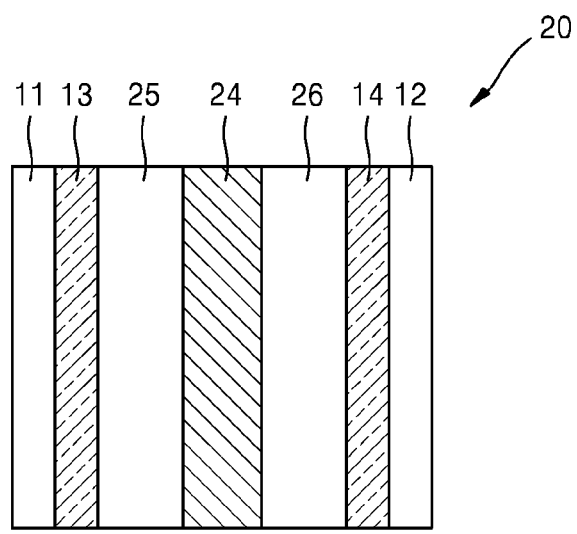
FIG. 4 is a cross-sectional view schematically illustrating a structure of a lithium air battery according to another exemplary embodiment.

FIG. 4 illustrates a structure of a lithium air battery 20 according to another embodiment.

Referring to FIG. 4, the lithium air battery 20 includes a first current collector 11, a second current collector 12, a positive electrode 13, a negative electrode 14, a separation layer 24 between the positive electrode 13 and the negative electrode 14, a first electrolyte 25 between the positive electrode 13 and the separation layer 24, and a second electrolyte 26 between the negative electrode 14 and the separation layer 24.

In FIG. 4, the negative electrode 14, the second electrolyte 26, and the separation layer 24 altogether may be referred to as a protection negative electrode. The positive electrode 13, the negative electrode 14, and the first electrolyte 25 shown in FIG. 2 correspond to the positive electrode 13, the negative electrode 14, and the first electrolyte 15 shown in FIG. 1, and thus descriptions thereof may be omitted here.

The second electrolyte 26 may be a non-aqueous electrolyte.

The separation layer 24 may be at least one selected from an inorganic solid electrolyte membrane, a polymer solid electrolyte membrane, and a gel-type polymer electrolyte. The separation layer 24 may have lithium ion conductivity.

Examples of the inorganic solid electrolyte may include $Cu_3N$, $Li_3N$, or LiPON.

Examples of the polymer solid electrolyte membrane may include a polyethylene oxide membrane, polyacrylonitrile, or polyester.

The polymer solid electrolyte membrane may be prepared by, for example, mixing the lithium ion conductive polymer and a lithium salt.

Examples of the lithium salt may include at least one or two selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are each independently a natural number), LiF, LiBr, LiCl, LiI, and lithium bis(oxalato)borate ($LiB(C_2O_4)_2$; LiBOB).

Alternatively, the solid electrolyte membrane may be a glass-ceramic solid electrolyte or a stack structure of a glass-ceramic solid electrolyte and a polymer solid electrolyte. The term "glass-ceramic" denotes a polycrystalline material produced by controlled crystallization of base glass. The lithium ion conductive solid electrolyte membrane will be now described in detail.

Examples of the lithium ion conductive solid electrolyte membrane may include lithium an ion conductive glass, a lithium ion conductive crystalline (ceramic or glass-ceramic), or an inorganic material containing a mixture thereof. In consideration of chemical stability, the lithium ion conductive solid electrolyte membrane may be formed from an oxide.

When the lithium ion conductive solid electrolyte membrane includes a large amount of lithium ion conductive crystal, the electrolyte membrane may have a high ion conductivity. In this regard, an amount of the lithium ion conductive crystal may be, for example, about 50 percent by weight (wt %) or more, about 60 wt % or more, or about 70 wt % or more based on the total weight of the solid electrolyte membrane.

Examples of the lithium ion conductive crystal may include a crystal having a perovskite structure with lithium ion conductivity, such as $Li_3N$, LISICON, or $La_{0.55}Li_{0.35}TiO_3$; $LiTi_2P_3O_{12}$ having a NASICON-type structure; and a glass-ceramic for precipitating these crystals.

The lithium ion conductive crystal may be, for example, $Li_{1+x+y}(Al, Ga)_x(Ti, Ge)_{2-x}Si_yP_{3-y}O_{12}$ (wherein, $0 \leq x \leq 1$ and $0 \leq y \leq 1$, for example, $0 \leq x \leq 0.4$ and $0 \leq y \leq 0.6$, or $0.1 \leq x \leq 0.3$ and $0.1 \leq y \leq 0.4$). To attain high ion conductivity, the lithium ion conductive crystal may not include a grain boundary that impedes ionic conduction. For example, since glass-ceramic may rarely include a pore or a grain boundary that interrupts ionic conduction, high ion conductivity and excellent chemical stability may be attained.

Examples of the lithium ion conductive glass-ceramic may include lithium-aluminum-germanium-phosphate (LAGP), lithium-aluminum-titanium-phosphate (LATP), and lithium-aluminum-titanium-silicon-phosphate (LATSP).

For example, when a parent glass has a composition of $Li_2O$—$Al_2O_3$—$TiO_2$—$SiO_2$—$P_2O_5$, and the parent glass is heat-treated to perform crystallization, the main crystalline phase is $Li_{1+x+y}Al_xTi_{2-x}Si_yP_{3-y}O_{12}$ (wherein, $0 \leq x \leq 1$ and $0 \leq y \leq 1$), wherein X and y satisfy, for example, $0 \leq x \leq 0.4$ and $0 \leq y \leq 0.6$, or, for example, $0.1 \leq x \leq 0.3$ and $0.1 \leq y \leq 0.4$.

As used herein, the phrase "a pore or a grain boundary that impedes ionic conduction" refers to a material that impedes ionic conduction and reduces the total ion conductivity of an inorganic material including lithium ion conductive crystals to 1/10 of the ion conductivity of the lithium ion conductive crystals themselves or less.

Also, as used herein, the term "a glass-ceramic" refers to a material obtained by heat-treating glass to precipitate crystalline phases from the glass phases, and includes an amorphous solid and crystals. In addition, the glass-ceramic may include a material whose phase is transformed from all glass phases to crystalline phases, for example, such as a material having crystallization (a degree of crystallinity) of 100 wt %. Although the glass-ceramic material has a crystallization of 100 wt %, pores may rarely exist between crystalline particles or in crystals.

Since the lithium ion conductive solid electrolyte membrane includes a large amount of glass-ceramic, high ion conductivity may be attained. Thus, 80 wt % of lithium ion conductive glass-ceramic or more may be included in the lithium ion conductive solid electrolyte membrane. In order to further increase the ion conductivity, the amount of the lithium ion conductive glass-ceramic included in the lithium ion conductive solid electrolyte membrane may be 85 wt % or more, or 90 wt % or more.

A $Li_2O$ component included in the glass-ceramic provide carriers of $Li^+$ ions, and are useful to attain lithium ion conductivity. In order to easily attain high ion conductivity, the amount of the $Li_2O$ component may be, for example, 12 wt % or more, 13 wt % or more, or 14 wt %. If there is an excessively high amount of the $Li_2O$ component, thermal stability of the glass may be reduced, and conductivity of the glass-ceramic may be reduced. Thus, an upper limit of the amount of the $Li_2O$ component may be 18 wt %, 17 wt % or 16 wt %.

An $Al_2O_3$ component included in the glass-ceramic may improve thermal stability of the glass-ceramic matrix. Simultaneously, $Al^{3+}$ ions are included to form a solid solution in the crystalline phase, thereby improving lithium ion conductivity. In order to further attain this effect, the lower limit of the amount of the $Al_2O_3$ component may be 5 wt %, 5.5 wt %, or 6 wt %. However, if the amount of the $Al_2O_3$ component exceeds 10 wt %, thermal stability of the glass may deteriorate, and conductivity of the glass-ceramic may also be reduced. Thus, the upper limit of the amount of the $Al_2O_3$ component may be 10 wt %, 9.5 wt %, or 9 wt %.

A $TiO_2$ component included in the glass-ceramic may facilitate formation of glass, may constitute the crystalline phase, and may be useful in glass and crystal. To change the crystalline phase to the glass phase, the crystalline phase is a main phase, and is precipitated from glass. In order to readily attain high ion conductivity, the lower limit of the amount of the $TiO_2$ component may be 35 wt %, 36 wt %, or 37 wt %. If there is an excessively high amount of the $TiO_2$ component, thermal stability of glass may be reduced, and conductivity of the glass-ceramic may be reduced. Thus, the upper limit of the amount of the $TiO_2$ component may be 45 wt %, 43 wt %, or 42 wt %.

A $SiO_2$ component included in the glass-ceramic may improve the melting characteristics and thermal stability of the glass-ceramic matrix. Simultaneously, $Si^{4+}$ ions are included to form a solid solution in the crystalline phase, thereby improving lithium ion conductivity. In order to further attain this effect, the lower limit of the amount of the $SiO_2$ component may be 1 wt %, 2 wt %, or 3 wt %. However, if there is an excessively high amount of the $SiO_2$ component, conductivity is reduced. Thus, the upper limit of the amount of the $SiO_2$ component may be 10 wt %, 8 wt %, or 7 wt %.

A $P_2O_5$ component included in the glass-ceramic may be useful to form glass, and may also constitute the crystalline phase. When the amount of the $P_2O_5$ component is 30% or less, it is difficult to change the crystalline phase to a glass phase. Thus, the lower limit of an amount of the $P_2O_5$ component may be 30 wt %, 32 wt %, or 33 wt %. If the amount of the $P_2O_5$ component exceeds 40 wt %, it is difficult to precipitate the crystalline phase from glass, and it is difficult to attain the desired property. Thus, the upper limit of the amount of the $P_2O_5$ component may be 40 wt %, 39 wt %, or 38 wt %.

When the above-described composites are used, glass may be easily obtained by casting melted glass. Glass-ceramic having the glass phase obtained by heat-treating the glass may have a high lithium ion conductivity of $1 \times 10^{-3}$ Siemens per centimeter ($S \cdot cm^{-1}$).

Also, in addition to the above-described composites, if glass-ceramic has a crystalline structure similar to the above-described composites, the $Al_2O_3$ component may be entirely or partially substituted by a $Ga_2O_3$ component, and the $TiO_2$ component may be entirely or partially substituted by a $GeO_2$ component. In addition, when the glass-ceramic is prepared, in order to reduce the melting point of the glass-ceramic or to improve stability of glass, a trace of other materials may be added as long as ion conductivity may not be significantly reduced.

In some embodiments, the lithium ion conductive solid electrolyte membrane may further include a solid polymer electrolyte, in addition to the glass-ceramic. The solid polymer electrolyte may be polyethylene oxide doped with a lithium salt. Examples of the lithium salt may include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

The polymer solid electrolyte membrane and the glass-ceramic may constitute a stack structure. The glass-ceramic may be placed between a first polymer solid electrolyte and a second polymer solid electrolyte, which include the composites described above.

The lithium ion conductive solid electrolyte membrane may be a single layer or multi-layer.

The second electrolyte 26 may be placed between the negative electrode 14 and the separation layer 24 of the lithium ion conductive solid electrolyte membrane. The second electrolyte 26 may use a liquid electrolyte including a non-aqueous organic solvent and a lithium salt or including an aqueous solvent and a lithium salt; an inorganic solid electrolyte membrane such as $Cu_3N$, $Li_3N$, or lithium phosphorous oxynitride (LiPON); a polymer electrolyte membrane; or a combination thereof. However, when the second electrolyte 26 is a solid electrolyte membrane, the second electrolyte 26 may replace the separation layer 24. Alternatively, the second electrolyte 26 may use the same material of the first electrolyte 25.

Examples of the non-aqueous organic solvent may include methyl butyl ether, diethyl ether, ethyl butyl ether, dibutyl ether, polyethyleneglycole dimethyl ether, tetraethylene glycol dimethyl ether; cyclohexanone, dioxane; dimethoxyethane, 2-methyltetrahydrofuran, 2,2-dimethyltetrahydrofuran, 2,5-dimethyltetrahydrofuran, tetrahydrofuran; methylacetate, ethylacetate, n-propylacetate, dimethylacetate, methylpropionate, ethylpropionate; methyl or ethyl formate; dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate, γ-butyrolactone, decanolide, valerolactone, mevalonolactone, caprolactone; diglyme, triglyme, tetraglyme; acetonitrile, benzonitrile, nitromethane, nitrobenzene, triethylamine, triphenylamine, tetraethyleneglycole diamine; dimethylformamide, diethylformamide, N-methylpyrrolidone; dimethylsulfone, tetramethylene sulfone, triethylphosphine oxide, 1,3-dioxolane, and sulfolane.

The working principle of the lithium air batteries 10 and 20 is as follows. Lithium provided from the negative electrode 14 during discharging of the battery reacts with oxygen provided from the positive electrode 13. As a result, a lithium oxide is produced, and the oxygen is reduced (oxygen reduction reaction: ORR). Also, during charging of the battery, the lithium product is reduced, the oxygen is oxidized, and thus, oxygen gas is evolved (oxygen evolution reaction: OER).

When the electrolyte is a non-aqueous electrolyte, a reaction occurs in the lithium air battery according to a reaction mechanism represented by Reaction Scheme 1 below:

Reaction Scheme 1

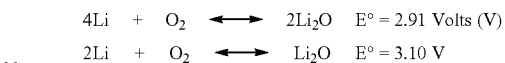

When the electrolyte is an aqueous electrolyte, a reaction occurs in the lithium air battery according to a reaction mechanism represented by Reaction Scheme 2 below:

Reaction Scheme 2

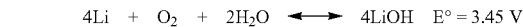

The term "air" used herein is not limited to atmosphere, and may include a combination of air and oxygen or pure oxygen gas. This wide definition of the term "air" may also be applied to, for example, an air battery or an air positive electrode.

The lithium air battery may be a lithium primary battery or a lithium secondary battery. In addition, a shape of the lithium air battery is not particularly limited. For example, the lithium air battery may be of a coin-type, a button-type, a sheet-type, a laminated-type, a cylindrical-type, a flat-type, or a horn-type. In addition, the lithium air battery may be used in a large battery for electric vehicles.

Hereinafter definitions of substituents used in the chemical formulas are presented.

The term "alkyl" used in a chemical formula refers to fully saturated branched or non-branched (or straight chain or linear) hydrocarbon groups.

Non-limiting examples of alkyl may include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

One or more hydrogen atoms of "alkyl" may be substituted with a halogen atom, a halogen atom substituted C1-C20 alkyl group (example: $CF_3$, $CHF_2$, $CH_2F$, or $CCl_3$), a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or its salt, a sulfonyl group, a sulfamoyl group, a sulfonic acid group or its salt, a phosphoric acid group or its salt, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" includes fluorine, bromine, chlorine, or iodine.

The term "halogen atom substituted C1-C20 alkyl group" refers to a C1-C20 alkyl group that is substituted with one or more halo groups. Non-limiting examples thereof may include a polyhaloalkyl group, which includes a monohaloalkyl group, a dihaloalkyl group, or a perhaloalkyl group.

Monohalokalkyl group includes an alkyl group substituted with one iodine, bromine, chlorine, or fluorine atom. The dihaloalkyl or the polyhaloalkyl group includes an alkyl group substituted with two or more halogen atoms that are identical to or different from each other.

The term "alkoxy" used in a chemical formula refers to alkyl-O—, wherein alkyl is as described above. Examples of alkoxy may include methoxy, ethoxy, propoxy, 2-propoxy, butoxy, tert-butoxy, pentyloxy, hexyloxy, cyclopropoxy, or cyclohexyloxy. One or more hydrogen atoms of alkoxy may be substituted with the same substituent groups as described for the alkyl group above.

The term "alkoxyalkyl" used in a chemical formula refers to an alkyl group substituted with the alkoxy group described above. One or more hydrogen atoms of the alkoxyalkyl group may be substituted with the same substituent groups as described for the alkyl group above. In this regard, the term "alkoxyalkyl" includes a substituted alkoxyalkyl moiety.

The term "alkenyl" used in a chemical formula refers to a branched or non-branched hydrocarbon having at least one carbon-carbon double bond. Examples of the "alkenyl" group may include vinyl, allyl, butenyl, isopropenyl, or isobutenyl. One or more hydrogen atoms of the alkenyl group may be substituted with the same substituent groups as described for the alkyl group above.

The term "alkynyl" used in a chemical formula refers to a branched or non-branched hydrocarbon having at least one carbon-carbon triple bond. Examples of the "alkynyl" group may include ethynyl, butynyl, isobutynyl, or isopropynyl.

One or more hydrogen atoms of the "alkynyl" may be substituted with the same substituent groups as described for the alkyl group above.

The term "aryl" used in a chemical formula refers to an aromatic hydrocarbon system containing one or more rings, used alone or in combinations.

Examples of "aryl" may include phenyl, naphthyl, or tetrahydronaphthyl.

Also, one or more hydrogen atoms of "aryl" may be substituted with the same substituent groups as described for the alkyl group above.

The term "arylalkyl" refers to an alkyl group substituted with an aryl group. Examples of the arylalkyl may include benzyl or phenyl-$CH_2CH_2$—.

The term "aryloxy" used in a chemical formula refers to —O-aryl, and examples of aryloxy may include phenoxy. One or more hydrogen atoms of aryloxy may be substituted with the same substituent groups as described for the alkyl group above.

The term "heteroaryl" used in a chemical formula refers to a monocyclic or bicyclic organic compound including one or more heteroatoms selected from N, O, P, and S, and the remaining ring atoms are C. For example, the heteroaryl group may include 1 to 5 heteroatoms and may include 5 to 10 ring members, wherein S or N may be oxidized to various oxidation states.

One or more hydrogen atoms of the "heteroaryl" may be substituted with the same substituent groups as described for the alkyl group above.

The term "heteroarylalkyl" refers to an alkyl group substituted with a heteroaryl group.

The term "heteroaryloxy" refers to a —O-heteroaryl moiety. One or more hydrogen atoms of "heteroaryloxy" may be substituted with the same substituent groups as described for the alkyl group above.

The term "heteroaryloxyalkyl" refers to an alkyl group that is substituted with a heteroaryloxy. One or more hydrogen atoms of heteroaryloxyalkyl may be substituted with the same substituent groups as described for the alkyl group above.

The term "carbocyclic" refers to a saturated or a partially unsaturated non-aromatic monocyclic, bicyclic, or tricyclic hydrocarbon group.

Examples of the monocyclic hydrocarbon may include cyclopentenyl, cyclohexyl, or cyclohexenyl. Examples of the bicyclic hydrocarbon may include bornyl, decahydronaphthyl, bicyclo[2.1.1]hexyl, bicyclo[2.2.1]heptyl, bicyclo[2.2.1]heptenyl, and bicyclo[2.2.2]octyl.

Examples of the tricyclic hydrocarbon may include adamantyl.

One or more hydrogen atoms of the "carbocyclic" may be substituted with the same substituent groups as described for the alkyl group above.

The term "heteroring" group refers to a ring group having 5 to 10 atoms containing a heteroatom such as nitrogen (N), sulfur (S), phosphorus (P), or oxygen (O). Examples of the hetero-ring group may include pyridyl. One or more hydrogen atoms of the heteroring group may be substituted with the same substituent groups as described for the alkyl group above.

The term "heteroringoxy" refers to a —O-heteroring. One or more hydrogen atoms of heteroringoxy may be substituted with the same substituent groups described for the alkyl group above.

The term "sulfonyl" refers to R"—$SO_2$—. Examples of R" may include hydrogen, alkyl, aryl, heteroaryl, aryl-alkyl, heteroaryl-alkyl, alkoxy, aryloxy, cycloalkyl, or heteroring.

The term "sulfamoyl" groups includes $H_2NS(O_2)$—, alkyl-$NHS(O_2)$—, (alkyl)$_2NS(O_2)$-aryl-$NHS(O_2)$—, alkyl-(aryl)-$NS(O_2)$—, (aryl)$_2NS(O)_2$, heteroaryl-$NHS(O_2)$—, (aryl-alkyl)-$NHS(O_2)$—, or (heteroaryl-alkyl)-$NHS(O_2)$—.

One or more hydrogen atoms of the sulfamoyl group may be substituted with the same substituent groups as described for the alkyl group above.

The term "amino group" refers to an embodiment where a nitrogen atom is covalently bonded to at least one carbon or a hetero atom. For example, the amino group may include —$NH_2$ and substituted moieties. Also, the "amino group" may include "alkylamino", in which a nitrogen atom is bonded to at least one additional alkyl group, or "arylamino" or "diarylamino", in which a nitrogen atom is bonded to one or at least two independently selected aryl groups.

The present inventive concept will be described in further detail with reference to the following examples. These examples are for illustrative purposes only and are not intended to limit the scope of the present disclosure.

Synthesis of Compound A

Preparation Example 1

Compound A with m:n=50:50

Compound A with a ratio of m:n=50:50 was synthesized according to a reaction scheme below:

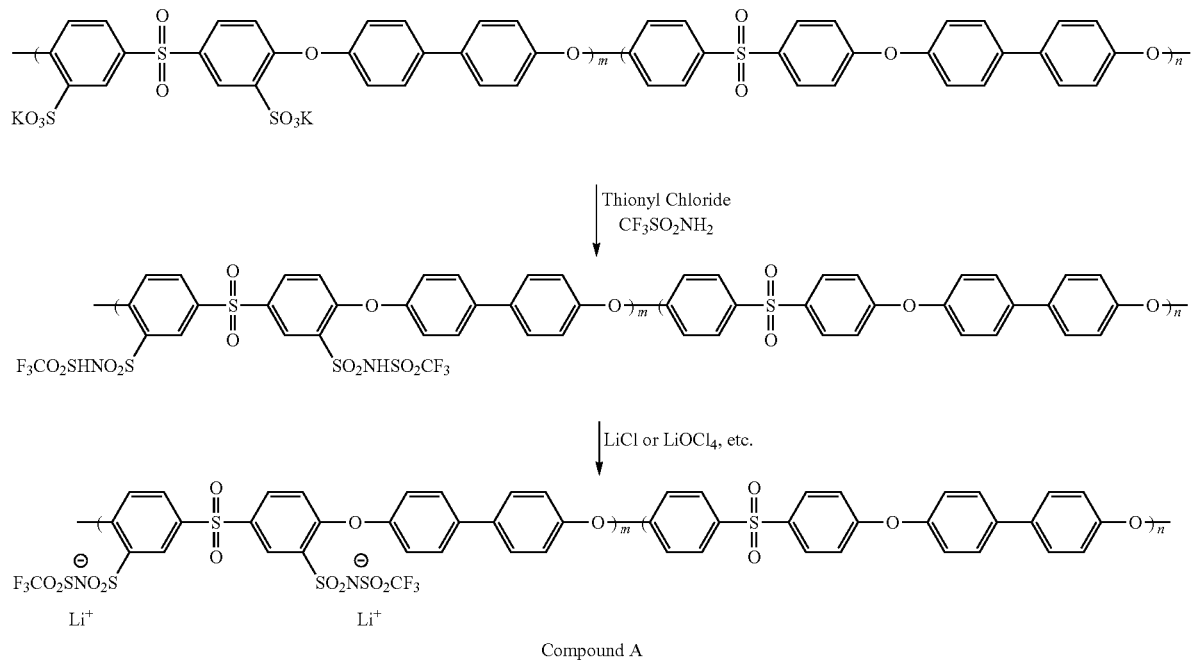

Compound A 3 grams (g) of polyarylene ether sulfone (m=0.5, n=0.5) was dissolved in dimethylacetamide (DMAc). Subsequently, 1.7 g of thionyl chloride and 4.32 g of trifluoromethanesulfonamide were slowly added thereto at 0° C. under a nitrogen atmosphere. The mixture was reacted at 80° C. for about 10 hours, and the reacted product was precipitated in isopropyl alcohol to remove unreacted materials. Dissolving the precipitate in DMAc completely and precipitating in isopropyl alcohol were repeated three times. The final precipitate was dried in a vacuum oven at 80° C. for 10 hours to obtain a polymer. A yield of the polymer was 70%.

The polymer was dissolved in N-methylpyrrolidone (NMP), and an excess amount of LiCl was added thereto to substitute lithium. The lithium-substituted polymer was precipitated in isopropyl alcohol, and the resultant was completely dried in a vacuum oven to obtain Compound A.

A weight average molecular weight of Compound A thus synthesized was about 700,000 g/mol.

Preparation Example 2

Compound A with m:n=70:30

Compound A with a ratio of m:n=70:30 was prepared in the same manner as in Preparation Example 1, except that polyarylene ether sulfone (m=0.7, n=0.3) was used instead of polyarylene ether sulfone (m=0.5, n=0.5), and 2.21 g of thionyl chloride and 5.54 g of trifluoromethanesulfonamide were added.

A weight average molecular weight of Compound A thus synthesized was about 650,000 g/mol.

Preparation Example 3

Compound A with m:n=90:10

Compound A with a ratio of m:n=90:10 was prepared in the same manner as in Preparation Example 1, except that polyarylene ether sulfone (m=0.9, n=0.1) was used instead of polyarylene ether sulfone (m=0.5, n=0.5), and 2.62 g of thionyl chloride and 6.57 g of trifluoromethanesulfonamide were added.

A weight average molecular weight of Compound A thus synthesized was about 300,000 g/mol.

Comparative Preparation Example 1

In order to compare physical properties of Compounds A prepared in Preparation Examples 1 to 3, polyethylene oxide (PEO) ($M_v$=600 k, 182028, Aldrich) was used as Comparative Preparation Example 1.

Preparation of Lithium Air Battery

Example 1

99 parts by weight of bis(trifluoromethanesulfonyl)imide ([DEMA][TFSI]) containing 0.5 molar (M) of lithium bis(trifluoromethanesulfonyl)imide (LiTFSI) was added to 1 part by weight of Compound A prepared in Preparation Example 1 to prepare an electrolyte.

14 parts by weight of carbon (Printex) and 86 parts by weight of the electrolyte thus obtained were mixed to prepare a positive electrode slurry, and the slurry was dried in an oven at a temperature of 100° C. for 120 minutes to prepare a positive electrode.

A hole having a size of 1 centimeters (cm)×1 cm was formed in a center of an aluminum film (a polypropylene coated aluminum film having a thickness of 200 µm) having a size of 5 cm×5 cm, and the hole was filled with a LATP film (LICGC™, Ohara Corporation) having a thickness of 150 µm by using an adhesive to prepare a first aluminum film of which a part is formed of LATP. Next, a second aluminum film having a size of 5 cm×5 cm, a copper current collector having a thickness of 20 µm, a lithium foil having a size of 1.4 cm×1.4 cm and a thickness of 100 µm, a Celgard-3501 separator (Celgard) having a thickness of 25 µm in which 1M LiTFSI-dissolved propylene carbonate was impregnated, and the first aluminum film were stacked and attached to each other by vacuum-heating to prepare a protected lithium negative electrode of an aluminum pouch type.

The protected lithium negative electrode was mounted in a stainless steel case, the electrolyte was stacked on the LATP part, a gas diffusion layer (GDL) of a carbon mesh material was disposed thereupon, a foaming nickel plate was disposed thereon, and a pressing member allowing air to be transferred to the positive electrode was used to press and fasten the stacked structure to prepare a lithium air battery.

Example 2

A lithium air battery was prepared in the same manner as in Example 1, except that Compound A prepared in Preparation Example 2 was used instead of Compound A prepared in Preparation Example 1.

Example 3

A lithium air battery was prepared in the same manner as in Example 1, except that Compound A prepared in Preparation Example 3 was used instead of Compound A prepared in Preparation Example 1.

Comparative Example 1

A lithium air battery was prepared in the same manner as in Example 1, except that a positive electrode slurry prepared by mixing 83 parts by weight of an electrolyte, which was prepared by adding LiTFSI (at a molar ratio of Li:EO=1:18) to polyethylene oxide (PEO) ($M_v$=600 k, 182028, Aldrich), and 17 parts by weight of carbon (Printex) was stacked on the LATP.

Comparative Example 2

A lithium air battery was prepared in the same manner as in Example 1, except that a positive electrode slurry prepared by mixing 17 parts by weight of carbon (Printex), 41.5 parts by weight of an electrolyte prepared by adding LiTFSI (at a molar ratio of Li:EO=1:18) to polyethylene oxide (PEO) ($M_v$=600 k, 182028, Aldrich), and 41.5 parts by weight of N,N-diethyl-N-methyl-N-(2-methoxyethyl)ammonium bis(trifluoromethanesulfonyl)imide ([DEMA][TFSI]) containing 0.5M of LiTFSI was stacked on the LATP.

Comparative Example 3

A lithium air battery was prepared in the same manner as in Example 1, except that a positive electrode slurry prepared by mixing 13 parts by weight of carbon (Printex) and 87 parts by weight of N,N-diethyl-N-methyl-N-(2-methoxyethyl)ammonium bis(trifluoromethanesulfonyl)imide ([DEMA][TFSI]) containing 0.5M of LiTFSI was stacked on the LATP.

Evaluation Example

Evaluation Example 1

Evaluation of Thermal Stability

Figure 5:
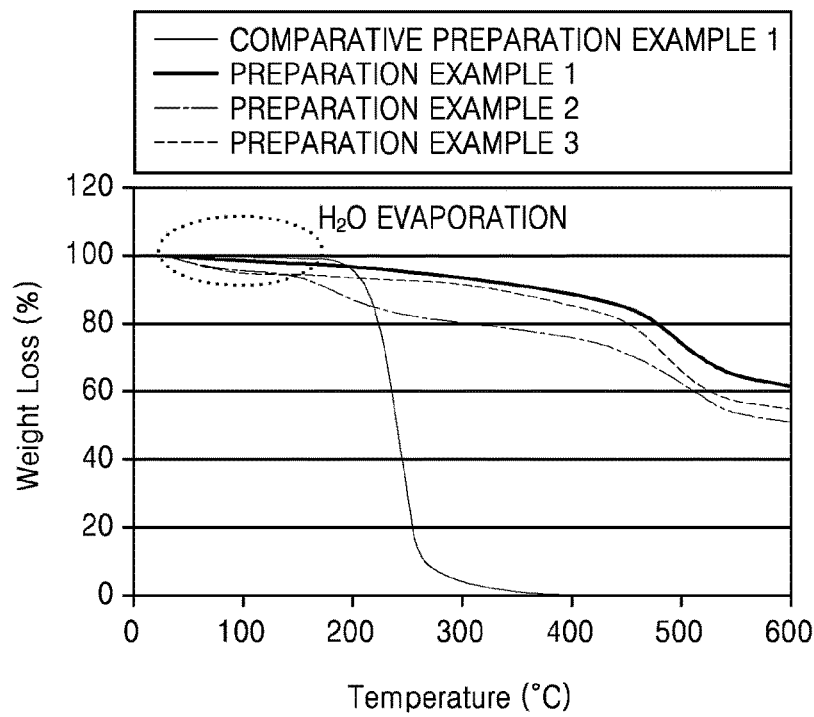
FIG. 5 is a graph of weight loss (percent, %) versus temperature (degrees Centigrade, ° C.) showing the results of thermal stability evaluation of Compound A synthesized in Preparation Examples 1 to 3 and PEO prepared in Comparative Preparation Example 1.

Thermal stability of Compounds A synthesized in Preparation Examples 1 to 3 and PEO of Comparative Preparation Example 1 was evaluated by thermogravimetric analysis (TGA), and the results are shown in FIG. 5. The TGA was performed in a nitrogen atmosphere, and a rate of temperature increase was 10 degrees Centigrade per minute (° C./min).

As shown in FIG. 5, a mass of PEO of Comparative Preparation Example 1 decreased as PEO rapidly decomposed at about 200° C., but a side chain of Compounds A of Preparation Examples 1 to 3 slowly decomposed until at about 450° C., and a main chain thereof started to decompose from about 500° C. An initial mass decrease of Compounds A of Preparation Examples 1 to 3 was due to evaporation of $H_2O$.

In this regard, it may be known that Compounds A prepared in Preparation Examples 1 to 3 had higher thermal stability compared to that of PEO.

Evaluation Example 2

Evaluation of Mechanical Property

Mechanical properties of Compounds A prepared in Preparation Examples 1 and 2 were evaluated by using a universal testing machine (Lloyd), and the results are shown in Table 1. Each of the samples were prepared by using ASTM standard D638 (Type V specimens dog-bone shaped sample), and a tension rate was 10 centimeters per minute (cm/min).

TABLE 1

|  | Preparation Example 1 | Preparation Example 2 |
|---|---|---|
| Thickness | 19.7 ± 0.7 µm | 19.7 ± 0.8 µm |
| Young's Modulus | 3.4 ± 0.4 GPa | 2.9 ± 0.2 GPa |
| Tensile Strength | 74.9 ± 2.1 MPa | 64.4 ± 0.7 MPa |
| % Strain at break | 8.7 ± 1.3% | 7.7 ± 1.4% |

However, a tensile strength of PEO of Comparative Preparation Example 1 was lower than 1 megaPascals (MPa), and thus evaluation thereof was not possible. For reference, according to the disclosure "Single-ion BAB Triblock Copolymers as Highly Efficient Electrolytes for Lithium-metal Batteries" (Nature Materials 12, pp. 452-457 (2013)), a tensile strength of a PS-PEO-PS copolymer is about 1 MPa, and a tensile strength of a P(STFSILi)-PEO-P(STFSILi) copolymer is about 10 MPa. In this regard, it may be presumed that a tensile strength of PEO is lower than about 1 MPa.

As shown in Table 1, Compounds A synthesized in Preparation Examples 1 and 2 had a firm main chain, and thus mechanical properties of Compounds A synthesized in Preparation Examples 1 and 2 were improved compared to those of PEO.

Evaluation Example 3

Evaluation of Ion Conductivity

Ion conductivities of the electrolytes in the lithium air batteries prepared in Examples 1 and 2 and Comparative Examples 1 and 2 were evaluated. The ion conductivities were measured by alternating current impedance analysis. A bias voltage of 10 milliVolts (mV) was applied to the electrolytes in the lithium batteries prepared in Examples 1 and 2 and Comparative Examples 1 and 2 within a frequency range of about 1 Hertz (Hz) to about 1 MHz, and a resistance was measured under the conditions of 20° C. and 0% at a relative humidity (RH) to evaluate an ion conductivity. The results are shown in Table 2.

TABLE 2

|  | Ion conductivity |
| --- | --- |
| Example 1 | $1.1 \times 10^{-5}$ S/cm |
| Example 2 | $7.8 \times 10^{-6}$ S/cm |
| Comparative Example 1 | $1.2 \times 10^{-6}$ S/cm |
| Comparative Example 2 | $2.0 \times 10^{-5}$ S/cm |

As shown in Table 2, the electrolyte used in Examples 1 and 2 had higher ion conductivities compared to the electrolyte used in Comparative Example 1. Also, the ion conductivities of the electrolyte used in Examples 1 and 2 were relatively lower than that of the electrolyte used in Comparative Example 2, but the electrolyte used in Examples 1 and 2 had excellent electrolyte stability compared to the electrolyte used in Comparative Example 2 as described below.

Evaluation Example 4

Evaluation of Electrolyte Stability

Electrolyte stability of the lithium air batteries prepared in Example 2 and Comparative Examples 1 and 3 was evaluated in the following manner.

The lithium air batteries prepared in Example 2 and Comparative Examples 1 and 3 were placed in a sealed container, and $O_2$ was injected into the sealed container to form an oxygen atmosphere. At 60° C., in the oxygen atmosphere, the lithium air batteries were discharged with a constant current of 0.24 milliAmperes per square centimeter (mA/cm$^2$) until a voltage reached 1.7 V (vs. Li). After the discharging, He gas was injected to the sealed container to form a He atmosphere. At 60° C., in the He atmosphere, the lithium air batteries were charged with a constant current of 0.24 mA/cm$^2$ until a voltage reached 4.3 V (vs. Li). The differences in amounts of $O_2$ and $CO_2$ in the sealed container before and after the charging at 60° C., in the He atmosphere, were measured by using a gas chromatography, and thus amounts of $CO_2$ production with respect to amounts of $O_2$ consumption were calculated. The results are shown in Table 3.

TABLE 3

|  | Difference in amount before and after charging (%) | | Amount of $CO_2$ production with respect to amount of $O_2$ consumption |
| --- | --- | --- | --- |
|  | $O_2$ | $CO_2$ |  |
| Example 2 | 1.5569% | 0.0141% | 2.3% |
| Comparative Example 1 | 1.2351% | 0.0878% | 19.6% |
| Comparative Example 3 | 3.09% | 0.0196% | 8.0% |

As shown in Table 3, the electrolyte used in Example 2 had a less amount of $CO_2$ production with respect to an amount of $O_2$ consumption compared to PEO of Comparative Example 1 and the ionic liquid of Comparative Example 3. This is because side reactions producing $CO_2$ occurred to the less extent in the electrolyte of Example 2, and thus the stability of the electrolyte of Example 2 was higher than that of the electrolytes of Comparative Examples 1 and 3.

Evaluation Example 5

Evaluation of Charging and Discharging Characteristics

At 60° C. in the oxygen atmosphere, the lithium air batteries prepared in Example 2 and Comparative Example 1 were discharged with a constant current of 0.24 mA/cm$^2$ until a voltage reached 1.7 V (vs. Li), charged with the same current until a voltage reached 4.2 V, and then charged until a charging current was 0.02 mA/cm$^2$ to complete one cycle of charging and discharging. The results of the discharging after the first cycle are shown in FIG. 6 and Table 4.

TABLE 4

|  | Discharge capacity [mAh/g] |
| --- | --- |
| Example 2 | 590 |
| Comparative Example 1 | 500 |

Figure 6:
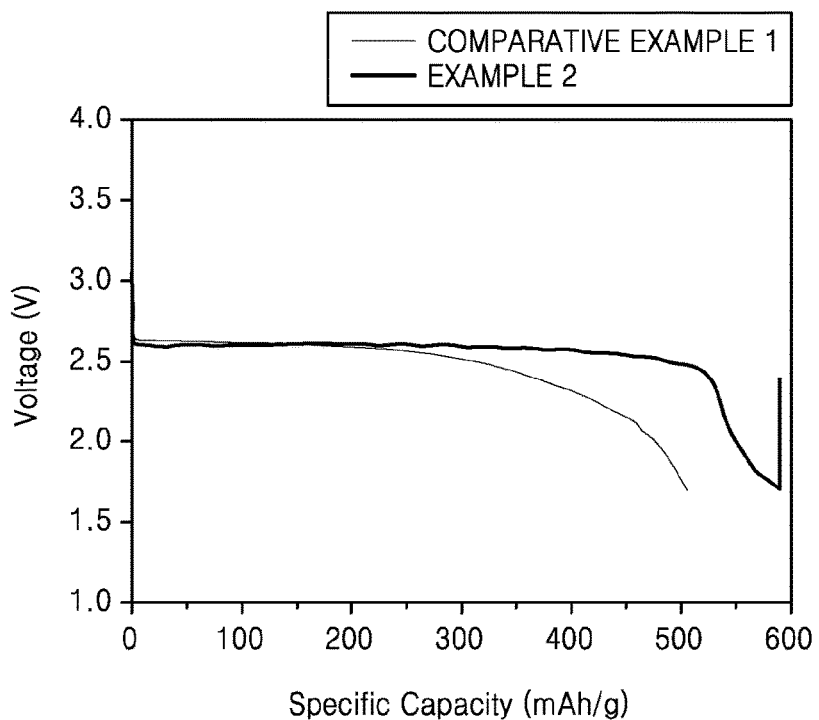
FIG. 6 is a graph of voltage (Volts, V) versus specific capacity (milliAmpere hours per gram, mAh/g), which is a first discharge cycle graph of lithium air batteries prepared in Example 2 and Comparative Example 1.

As apparent from FIG. 6 and Table 4, a discharge capacity of the lithium air battery of Example 2 significantly increased compared to that of the lithium air battery of Comparative Example 1. In this regard, it is deemed that the discharge capacity of the lithium air battery including Compound A increased because migration of lithium ions is facilitated by Compound A that increases an ion conductivity (see Table 2).

As described above, according to the one or more of the above embodiments, a polymer electrolyte for a lithium battery has high thermal stability and excellent mechanical properties. Also, a lithium battery including the polymer electrolyte may have improved electrical and chemical stability even at high voltage.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A polymer electrolyte for a lithium battery, the polymer electrolyte comprising a compound represented by Formula 1:

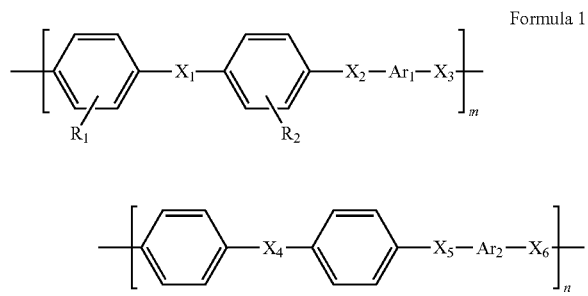

wherein, in Formula 1,
$X_1$, $X_2$, $X_3$, $X_4$, $X_5$, and $X_6$ are each independently —$SO_2$— or —O—,
$Ar_1$ and $Ar_2$ are each independently a substituted or unsubstituted C6-C30 arylene group or a substituted or unsubstituted C5-C30 heteroarylene group,
at least one selected from $R_1$ and $R_2$ is a lithium ion conductive group, provided that when only one selected from $R_1$ and $R_2$ is a lithium ion conductive group, the other one selected from $R_1$ and $R_2$ is a hydrogen atom,
$0 \leq m \leq 1$, $0 \leq n \leq 1$, and $m+n=1$, and
a weight average molecular weight of the compound represented by Formula 1 is in a range of about 500 grams per mole to about 1,000,000 grams per mole.

2. The polymer electrolyte of claim 1, wherein the lithium ion conductive group is at least one selected from Formulae 2 to 6:

   Formula 2

   Formula 3

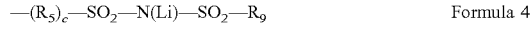   Formula 4

   Formula 5

   Formula 6 wherein, in Formulae 2 to 6,
$R_3$, $R_4$, $R_5$, $R_6$, $R_7$, and $R_8$ are each independently a single bond, a substituted or unsubstituted C1-C10 alkylene group, a substituted or unsubstituted C6-C20 arylene group, or a substituted or unsubstituted C3-C20 heteroarylene group,
$R_9$ is a substituted or unsubstituted C1-C10 alkyl group, a substituted or unsubstituted C6-C20 aryl group, or a substituted or unsubstituted C3-C20 heteroaryl group, and
a, b, c, d, e, and f are each 0 or 1.

3. The polymer electrolyte of claim 2, wherein at least one hydrogen in each of $R_3$, $R_4$, $R_5$, $R_6$, $R_7$, and $R_8$ is substituted with a substituted or unsubstituted C1-C20 alkyl group substituted with a nitro group, a cyano group, a carboxylic acid group or its salt, or a sulfonamide group, or a halogen, and at least one hydrogen in $R_9$ is substituted with a halogen.

4. The polymer electrolyte of claim 1, wherein the lithium ion conductive group is selected from —$SO_3Li$, —$COOLi$, —$SO_2N(Li)SO_2CF_3$, —$SO_2N(Li)SO_2CF_2CF_3$, —$SO_2C_6H_4COOLi$, —$C_6H_3(SO_2NH_2)COOLi$, —$CH(COOLi)CH_2COOLi$, —$C_6H_3(OH)COOLi$, —$C_6H_2(NO_2)_2COOLi$, and —$CH_2C(CH_3)_2COOLi$.

5. The polymer electrolyte of claim 1, wherein $Ar_1$ and $Ar_2$ are each independently selected from:

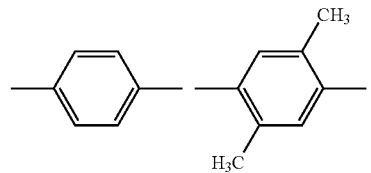

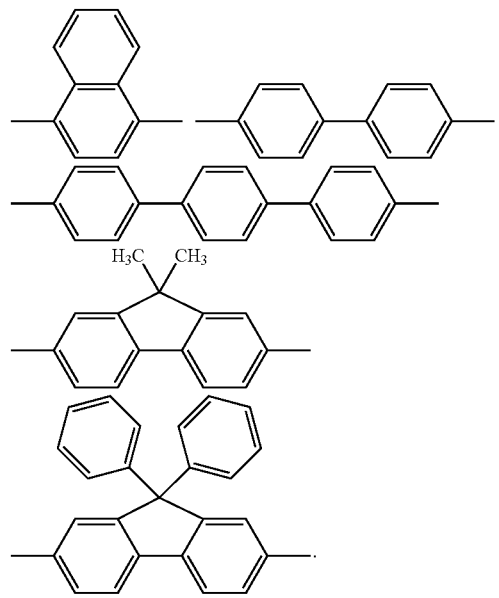

6. The polymer electrolyte of claim 1, wherein the polymer electrolyte is represented by Formula 7:

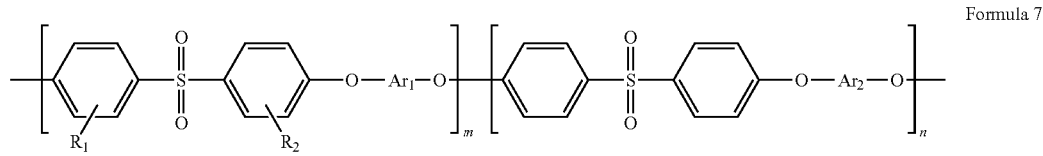   Formula 7 wherein, in Formula 7,
$Ar_1$, $Ar_2$, $R_1$, $R_2$, m, and n are as defined in connection with Formula 1.

7. The polymer electrolyte of claim 6, wherein the polymer electrolyte is represented by Formula 8:

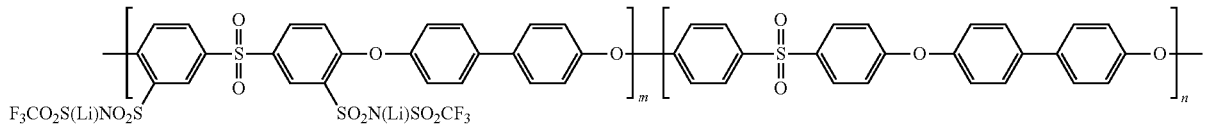

Formula 8 wherein, in Formula 8,
m and n are as defined in connection with Formula 1.

8. The polymer electrolyte of claim 1, wherein a ratio m:n is in a range of about 90:10 to about 50:50.

9. The polymer electrolyte of claim 1, further comprising a lithium salt.

10. The polymer electrolyte of claim 9, wherein the lithium salt comprises at least one selected from $LiPF_6$, $LiBF_4$, $LiSbF_6$, $LiAsF_6$, $LiN(SO_2C_2F_5)_2$, $LiN(SO_2F_2)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are each independently a natural number), LiF, LiBr, LiCl, LiI, and $LiB(C_2O_4)_2$ (lithium bis(oxalato)borate).

11. The polymer electrolyte of claim 9, wherein the lithium salt comprises a lithium sulfonimide compound.

12. The polymer electrolyte of claim 11, wherein the lithium sulfonimide compound comprises at least one selected from $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ (wherein, p and q are different from each other, and p and q are each independently an integer from 1 to 20), $LiN((SO_2)_2C_pF_{2p})$ (wherein, p is an integer from 1 to 10), $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ (wherein, p is an integer from 1 to 10), and $LiN(C_{10}F_7SO_2)(C_pF_{2p+1}SO_2)$ (wherein, p is an integer from 1 to 10).

13. The polymer electrolyte of claim 1, further comprising an ionic liquid.

14. The polymer electrolyte of claim 13, wherein the ionic liquid comprises at least one selected from diethylmethylammonium trifluoromethanesulfonate, dimethylpropylammonium trifluoromethanesulfonate, N,N-diethyl-N-methyl-N-(2-methoxyethyl)ammonium bis(trifluoromethanesulfonyl)imide, N-methyl-N-propylpiperidinium bis(trifluoromethanesulfonyl)imide, N-butyl-N-methyl pyrrolidinium bis(trifluoromethanesulfonyl)imide, and methyl propylpiperidinium trifluoromethanesulfonylimide.

15. A lithium battery comprising:
a positive electrode;
a negative electrode; and
the polymer electrolyte of claim 1 disposed between and in contact with the positive electrode and the negative electrode.

16. The lithium battery of claim 15, wherein the lithium battery is a lithium air battery or a lithium secondary battery.

17. A binder for a lithium battery, wherein the binder comprises the polymer electrolyte of claim 1.

* * * * *